(12) United States Patent
Thodeme et al.

(10) Patent No.: US 10,752,084 B2
(45) Date of Patent: Aug. 25, 2020

(54) AIR DUCTING SYSTEM AND MEASURING SYSTEM FOR MEASURING AT LEAST ONE PARAMETER OF AN AIR FLOW EMERGING FROM AN AIR VENT

(71) Applicant: FORD GLOBAL TECHNOLOGIES, LLC, Dearborn, MI (US)

(72) Inventors: Sree Ram Gopal Reddy Thodeme, Cologne (DE); Bernd Dienhart, Cologne (DE); Gautam Maiya Manoor, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 16/007,520

(22) Filed: Jun. 13, 2018

(65) Prior Publication Data
US 2018/0361818 A1 Dec. 20, 2018

(30) Foreign Application Priority Data

Jun. 16, 2017 (DE) .......................... 10 2017 210 124

(51) Int. Cl.
*B60H 1/00* (2006.01)
(52) U.S. Cl.
CPC ......... *B60H 1/008* (2013.01); *B60H 1/00564* (2013.01); *B60H 1/00585* (2013.01); *B60H 2001/00635* (2013.01)
(58) Field of Classification Search
CPC .......... B60H 1/00564; B60H 1/00585; B60H 1/008; B60H 2001/00635; B60H 2003/0683; F24F 11/39
See application file for complete search history.

(56) References Cited

U.S. PATENT DOCUMENTS 3,550,522 A * 12/1970 Bauer .................... B60H 1/246
454/144
4,481,829 A * 11/1984 Shortridge ................ G01F 1/46
73/861.66
(Continued)

FOREIGN PATENT DOCUMENTS

CN 102235386 A 11/2011
JP S6113112 A 1/1986
(Continued)

OTHER PUBLICATIONS

English Machine Translation of CN102235386A.
English Machine Translation of JPS6113112A.
English Machine Translation of KR20150005100A.

*Primary Examiner* — Natalie Huls
(74) *Attorney, Agent, or Firm* — David Coppiellie; King & Schickli, PLLC

(57) ABSTRACT

An air ducting system is provided for ducting an air flow emerging from an air vent, which serves to introduce an air flow directly into a passenger compartment of a vehicle, to a measuring device for measuring of at least one parameter of the air flow. The measuring device includes at least one collector unit for collecting the air flow emerging from the air vent, which can be arranged on the air vent in such a way that a contact face of the collector unit completely encloses at least one outlet aperture of the air vent. In order to improve a measurement of at least one parameter of the air flow, the air ducting system comprises at least two air duct units of different design, either of which can be connected to and non-destructively detached from the collector unit.

11 Claims, 6 Drawing Sheets

(56) References Cited

U.S. PATENT DOCUMENTS

| | | | |
|---|---|---|---|
| 6,107,923 A | 8/2000 | Christol | |
| 6,843,717 B1* | 1/2005 | Bennett | B60H 1/00564 128/200.27 |
| 7,437,883 B1* | 10/2008 | Baldal | B60H 1/00564 62/259.3 |
| 2002/0189008 A1* | 12/2002 | Hipponsteel | E03D 9/05 4/213 |
| 2018/0361822 A1* | 12/2018 | Fischer | B60H 1/00564 |
| 2019/0368966 A1* | 12/2019 | Mizrahi | G01M 3/022 |

FOREIGN PATENT DOCUMENTS

| | | |
|---|---|---|
| KR | 20150005100 A | 1/2015 |
| WO | 2004063676 A1 | 7/2004 |

\* cited by examiner

AIR DUCTING SYSTEM AND MEASURING SYSTEM FOR MEASURING AT LEAST ONE PARAMETER OF AN AIR FLOW EMERGING FROM AN AIR VENT

TECHNICAL FIELD

This document relates to an air ducting system for ducting an air flow emerging from an air vent, which serves to introduce an air flow directly into a passenger compartment of a vehicle, as well as to a measuring device for measuring at least one parameter of the air flow. That measuring device comprises at least one collector unit for collecting the air flow emerging from the air vent, which can be arranged on the air vent in such a way that a contact face of the collector unit completely encloses at least one outlet aperture of the air vent.

This document also relates to a measuring system for measuring at least one parameter of an air flow emerging from an air vent, which serves to introduce an air flow directly into a passenger compartment of a vehicle. That measuring device comprises at least two measuring devices of different design for alternative use in measuring the parameter and at least one air ducting system for ducting the air flow from the air vent to the respective measuring device.

BACKGROUND

Motor vehicles are equipped with ventilation and/or air conditioning systems, particularly in order to be able to regulate an air temperature in a passenger compartment of a motor vehicle. For this purpose, a corresponding system comprises air vents, each of which serve for introducing an air flow directly into the passenger compartment. The air vents may be arranged, for example, on a dashboard, a center console or in the footwell of the passenger compartment. The air vents may be supplied with air either individually or in groups and may comprise means of adjustment for adjusting the direction and/or strength of the air flow emerging from each of the vents.

A known method for registering the state of a ventilation and/or air conditioning system of a motor vehicle is to connect a measuring device for measuring a parameter of an air flow via an air duct passage to an air vent and to measure the parameter during operation of the ventilation and/or air conditioning system. On the basis of the measured parameter it is possible to assess whether the ventilation and/or air conditioning system is functioning correctly. For example, it can be determined whether a blower of the ventilation and/or air conditioning system is producing a specific output and/or whether the air flow flowing to the air vent is being diminished, for example, by a fouled air filter or the like. If this is the case, servicing of the ventilation and/or air conditioning system is required.

A precise measurement of a parameter of an air flow emerging from an air vent of a motor vehicle is normally not possible by conventional means. In particular, the measurement may be adversely affected due to any leakage of air occurring and/or due to turbulence occurring as a result of flow edges present in the air duct passage.

U.S. Pat. No. 6,107,923 A discloses a device for registering the state of an air filter in a heating and/or air conditioning system for the interior of a motor vehicle. The device comprises a sensor for use on the outlet of an air vent of the system, in order to register the emerging air flow, together with a measuring device connected to the sensor for measuring a parameter of the air flow. The sensor comprises a housing, which has a contact face of a shape matched to the shape of the air vent, and an outlet aperture, which is connected to the measuring device by means of a flexible pipe or a flexible duct. The housing is detachable from the pipe or the duct. The outline of the contact face is provided with a deformable coating, which is impermeable to air and made from foam plastic, for example.

WO 2004/063676 A1 relates to a portable air flow sensor for measuring the amount of air delivered from a ventilation unit. The portable air flow sensor is capable of measuring the air flow of a vehicle air conditioning duct system accurately and rapidly. The portable air flow sensor comprises a fan for cooling a computer CPU.

KR 2015/0005100 A relates to a portable digital volumetric air flow measuring device having a seal structure. The portable digital volumetric air flow measuring device comprises: a cylindrical housing, in which an inlet cover and a housing are arranged; a flexible duct, which connects the cylindrical housing to a ventilation unit; an air cleaner which is installed in the inlet cover in order to clean the air; and a measuring element which measures the volume of air passing through the air cleaner. In addition, the portable digital volumetric air flow measuring device comprises a front nozzle cover having a cover coupling channel, into which the inlet cover is inserted, and a first seal insertion channel, into which a number of sealing elements are adhesively inserted. It further comprises a rear nozzle cover having a seating channel, in which an outer peripheral flange of the measuring element is seated. It further comprises a housing insertion channel, into which the housing is inserted. It further comprises a second seal insertion channel, into which a number of sealing elements are inserted; and a sealing element, in which multiple nozzle sealing elements, adhesive elements and body parts are contained, in order to improve the cohesion, by increasing the adhesion between the front nozzle cover and the rear nozzle cover on both surfaces of the outer peripheral flange.

CN 102 235 386 A discloses an air flow drive device having a deflector element, an air flow receiver, a first aperture and a second aperture, the first aperture and the second aperture ducting the air flow. The aperture area of the first aperture differs from that of the second aperture and the air pressures of the first aperture and the second aperture have a differential value, so that the differential value can be used to calculate the rate of flow in the air flow drive device.

JP S6 113 112 A discloses an air flow rate measuring instrument, in which a static pressure detector for registering a mean static pressure is arranged in an air collector hood. An aperture of the air collector hood is applied to a diffusion aperture in the cover. A pitot tube for registering a static pressure is provided in the air collector hood, in order to register a mean static pressure in the hood. The hood is moreover provided with a connecting pipe, in order to register a mean total pressure by means of a pitot tube. At the bottom end of the connecting pipe a fan is provided. The fan adjusts a variable blower, so that the static pressure in the hood can be equal to that of the chamber. The mean static pressure is then subtracted from the mean total pressure, in order to calculate the mean dynamic pressure, from which the volume of air is determined.

SUMMARY

The object of the system is to improve a measurement of at least one parameter of an air flow emerging from an air vent, which serves to introduce an air flow directly into a passenger compartment of a vehicle.

The object is achieved by an air ducting system, having the features of the following claims, comprising at least two air duct units of different design, either of which can be connected to and non-destructively detached from the collector unit, and which each comprise a first coupling end portion for connecting the respective air duct unit to the collector unit and a second coupling end portion for connecting the respective air duct unit to the respective measuring device, wherein the first coupling portions are of the same design and the air duct units differ from one another at least in the design of their second coupling portions.

It must be pointed out that the features and measures individually cited in the following description may be combined with one another in any technically appropriate manner and may set forth further embodiments of the system. The description additionally characterizes and specifies the system, particularly in conjunction with the figures.

The air ducting system serves to deliver the air emerging from the air vent to measuring devices of various design, by connecting an air duct unit to the collector unit, which comprises a coupling structure which is suitable for connection to the respective measuring device. The air ducting system can thereby be matched to the design of the respective measuring device, for example in order to prevent an air leakage in the connecting area between the air duct unit and the measuring device. When using or exchanging various measuring devices it is therefore not necessary to exchange the entire air ducting system. Instead different measuring devices can be combined with one and the same collector unit, the design of which is preferably matched to the respective design of the air vent. There is therefore no need to produce and stock a complete air ducting system for each combination of a specific air outlet aperture and a specific measuring device, which reduces manufacturing and storage costs.

The air ducting system may also comprise three or more air duct units that can be combined with the collector unit. In particular the air ducting system may comprise a separate air duct unit for each design variant of a measuring device, so that the number of air duct units corresponds to the number of design variants of the measuring devices. The air ducting devices may differ from one another solely in the design of their second coupling end portions or also additionally in other areas. The first coupling end portions are of the same design, in order to be able to connect the various air ducting devices to one and the same and collector unit. Each air duct unit can be connected to and non-destructively detached from the collector unit, so as to facilitate an exchange of the air duct units, in order to match the air ducting system to the respective design of the measuring device used. For dimensional stability, at least one air duct unit may be made partly or entirely of a plastic, a composite material, a metal or a metal alloy. The air duct units preferably have the facility for alternative, airtight connection to the collector unit. The air duct units are of tubular design and each comprise a continuous curved or rectilinear air duct passage, through which the air flow flows.

For dimensional stability the collector unit may be made partly or entirely of a plastic, a composite material, a metal or a metal alloy. For vehicle development stage (air flow) measurements, the vehicle specific collectors may be manufactured using rapid prototype techniques (to save time and manufacturing costs). The collector unit preferably collects all of the air flow emerging from the air vent. For this purpose, the collector unit can be arranged on the air vent in such a way that the contact face of the collector unit completely encloses the outlet aperture of the air vent and in so doing affords the collector unit an airtight connection to the air vent or a portion of some other vehicle component enclosing this. The collector unit is of tubular design and comprises a continuous curved or rectilinear air duct passage, through which the air flow flows.

The respective measuring device comprises at least one sensor, which serves, for example, for registering a flow velocity or an air pressure of the air flow emerging from the air vent. The respective measuring device may comprise an evaluating electronic unit or be connected to such a unit, in order to be able to evaluate the parameter of the air flow measured by the measuring device. This allows a state of a ventilation and/or air conditioning system of a motor vehicle to be inferred from the measured parameter of the air flow, so as to be able to detect whether the ventilation and/or air conditioning system is functioning correctly, or whether servicing or repair of the ventilation and/or air conditioning system is required.

According to one advantageous embodiment, the collector unit comprises a connecting portion for connecting the collector unit to the respective air duct unit, wherein the connecting portion and the first coupling end portion of the respective air duct unit form a bayonet fastening. The connection between the collector unit and the respective air duct unit can thereby easily be made and detached again in order to change the air duct unit. Alternatively, the connection between the collector unit and the respective air duct unit may be made via at least one detachable mechanical means of some other design, such as a screwed connection, a latching connection, a snap connection or the like, for example.

In a further advantageous embodiment, the contact face is formed at least partly by at least one flexible sealing element. When the collector unit is arranged on the air vent, the sealing element comes into direct contact with the air vent or a portion of a further vehicle component enclosing this, thereby affording the collector unit an airtight connection to the air vent or the component portion. Owing to the flexible design of the sealing element, tolerances between the contact face of the collector unit and the surface of the particular air vent or component portion coming into contact with this can be compensated for, thereby ensuring that in the connecting area between the collector unit and the air vent or component portion no air from the air flow gets into the surroundings. The sealing element may be of elastic design, for example. The contact face may also be formed partly or entirely by two or more sealing elements.

The sealing element is advantageously connected to the collector unit by a cohesive material joint. The sealing element can thereby easily be arranged on the collector unit and removed from the latter—for example in the event of a need to replace a defective sealing element. The sealing element may take the form, for example, of an adhesive strip, which is stuck onto the contact face.

It is furthermore advantageous if the sealing element is formed at least partly from a foam material. This makes the sealing element flexible and elastic and able to conform to the shape of the contact face of the air vent or a portion of a vehicle component enclosing this.

According to a further advantageous embodiment the second coupling end portion of the respective air duct unit is designed to receive a component portion of a measuring device at least partly through positive interlock. This affords an easy way of making a secure mechanical connection between the respective second coupling portion and the respective measuring device. This connection may be secured by at least one mechanical fastener.

In a further advantageous embodiment an air duct passage running through the collector unit and/or the respective air duct unit is formed without any flow edges. This allows the air flow to flow through the collector unit and the air duct unit without turbulence, which might influence a measurement of the parameter of the air flow, occurring in the collector unit or the air duct unit.

According to a further advantageous embodiment the air ducting system comprises at least two collector units of different design, the connecting portions of which are of the same design and which differ from one another at least in the design of their contact faces. The air ducting system may comprise a separate collector unit for each type of air vent, so that the design of the air ducting system can be adapted to the particular purpose. Since the connecting portions of the collector units which serve to connect the respective collector unit to an air duct unit are of the same design, the same air duct units can be combined with or connected to the various collector units.

The aforementioned object is further achieved by a measuring system having the features of the following claims, the air ducting system of which is formed according to one of the aforementioned embodiments or any combination of at least two of these embodiments with one another.

The advantages stated above with regard to the air ducting system are also associated with the measuring system. The measuring devices may differ in that they serve for measuring different parameters of the air flow. A measuring device may be designed, for example, for measuring the flow velocity or the static or dynamic pressure inside the air flow.

According to an advantageous embodiment each measuring device comprises a component portion, which can be connected to the respective air duct unit and which is connected to the second coupling end portion of the respective air duct unit at least partly through positive interlock. This allows the respective measuring device to be easily connected to the respective air duct unit.

According to a further advantageous embodiment the measuring system comprises at least one mechanical fastener for securing the connection between the respective air duct unit and the respective measuring device. This may serve, for example, to secure a positively interlocking connection between the respective measuring device and the respective air duct unit.

BRIEF DESCRIPTION OF THE DRAWING FIGURES

Further advantageous embodiments of the system are disclosed in the dependent claims and the following description of the figures, of which:

DETAILED DESCRIPTION

Figure 1:
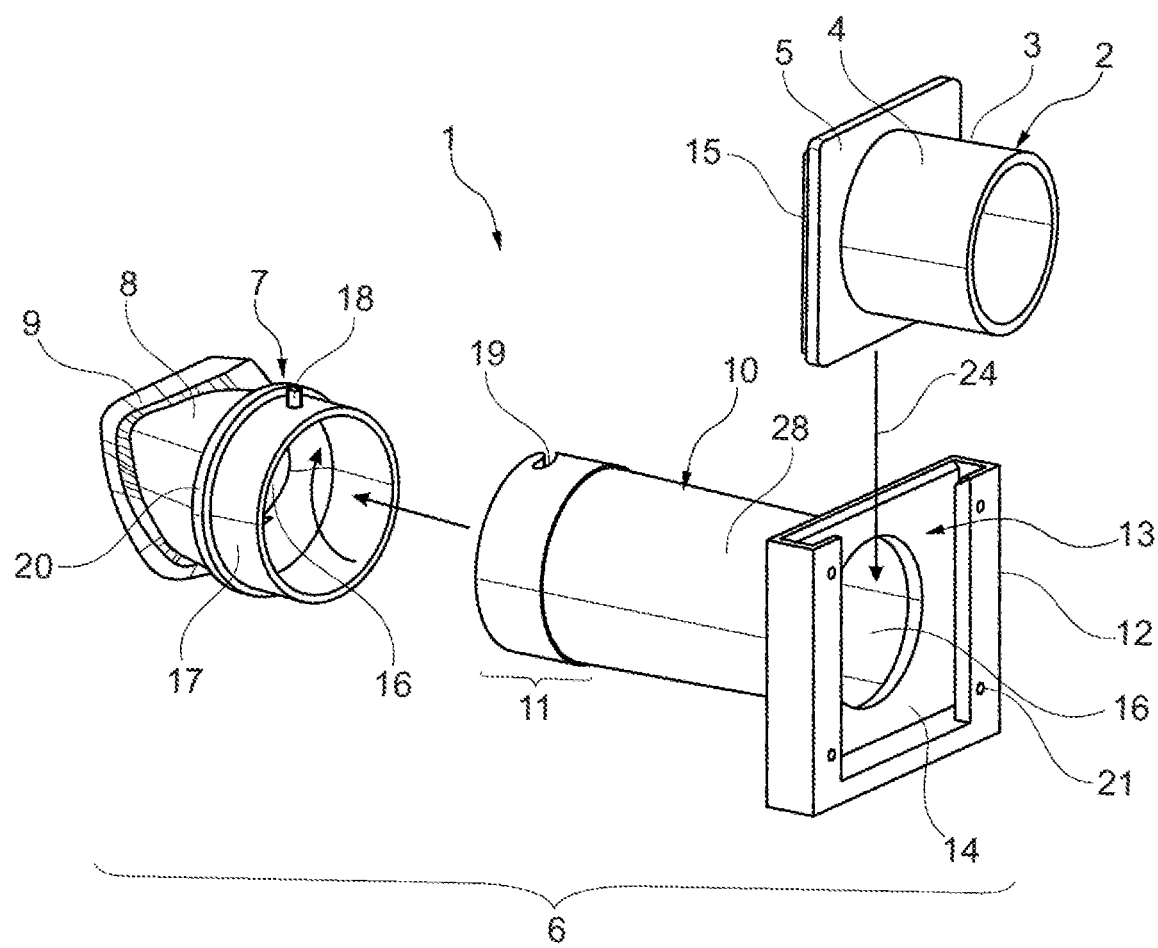
FIG. 1 shows a schematic and perspective representation of an exemplary embodiment of a measuring system for connection to a first measuring device.

In the various figures the same parts are always provided with the same reference numerals, for which reason these are generally also described only once.

FIG. 1 shows shows a schematic and perspective representation of an exemplary embodiment of a measuring system 1 for connection to a first measuring device 2, for measuring at least one parameter of an air flow emerging from an air vent (not shown), which serves to introduce an air flow directly into a passenger compartment of a vehicle (not shown).

Figure 3:
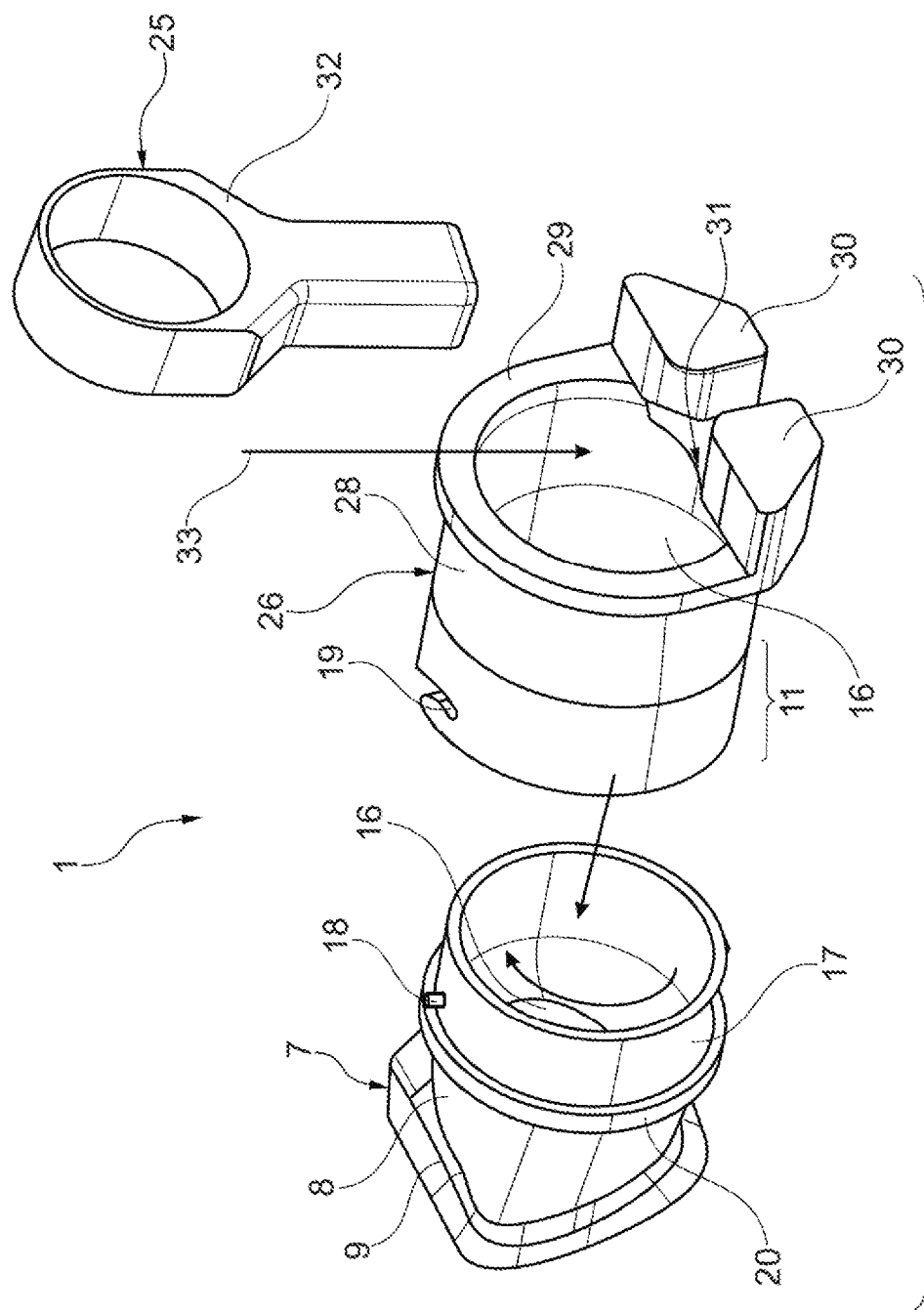
FIG. 3 shows a schematic and perspective representation of the exemplary embodiment of a measuring system for connection to a second measuring device.
Figure 4:
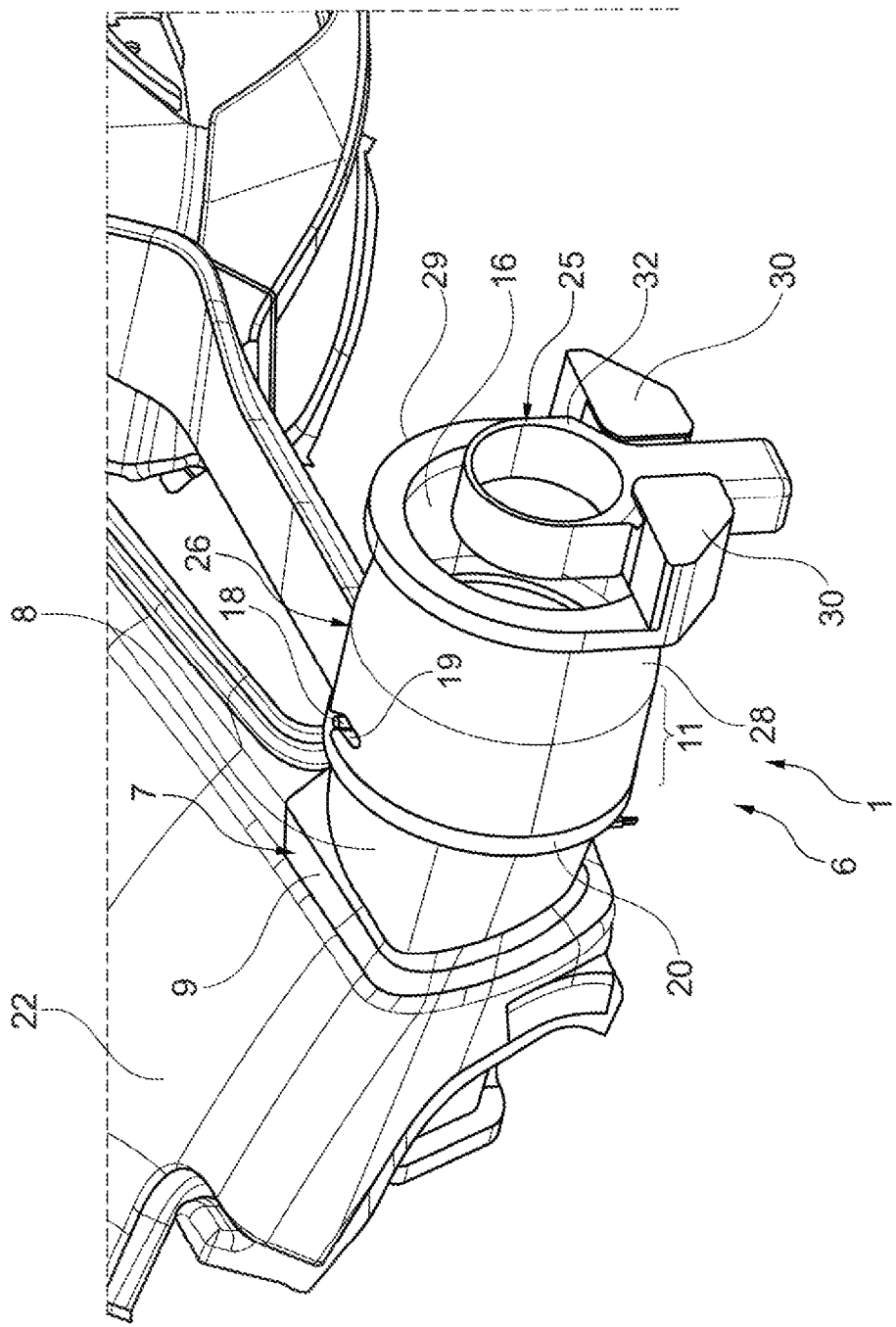
FIG. 4 shows a schematic and perspective representation of the measuring system shown in FIG. 3 in use.

The measuring system 1 comprises two measuring devices 2 (and 25 in FIGS. 3 and 4) of different design for alternative use in measuring the parameter, of which only a component portion 3 of the first measuring device 2 is shown in FIG. 1. A component portion of the second measuring device is shown in FIGS. 3 and 4. The component portion 3 shown comprises a tubular part 4, on one end of which a connecting flange 5 is arranged projecting radially outwards.

Figure 5:
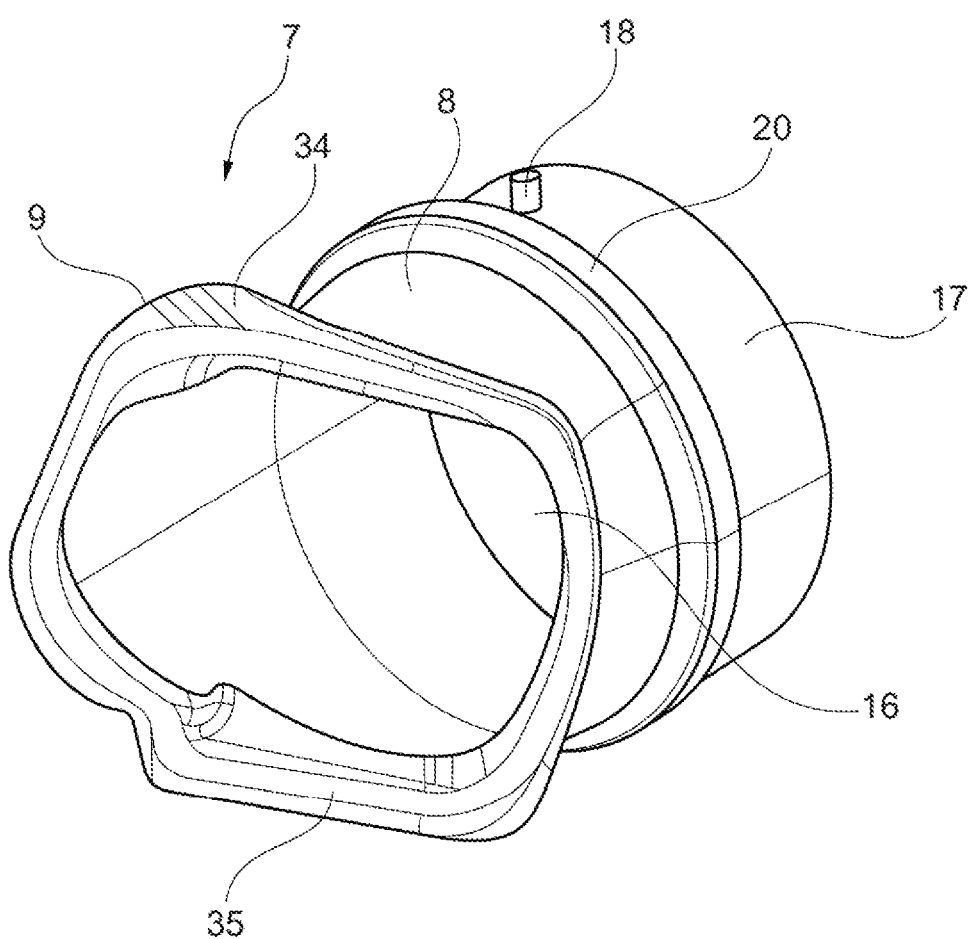
FIG. 5 shows a schematic and perspective representation of the collector unit shown in FIGS. 1 to 4.

In addition, the measuring system 1 comprises an air ducting system 6 for ducting the air flow from the air vent directly to the measuring device 2. The air ducting system 6 comprises a collector unit 7 for collecting the air flow emerging from the air vent, which unit can be arranged on the air vent in such a way that a contact face of the collector unit 7, not shown in FIG. 1, completely encloses an outlet aperture (not shown) of the air vent. The collector unit 7 comprises a tubular portion 8, on one end of which a contact flange 9 is arranged projecting radially outwards, on which the contact face (not shown) is formed. The contact face is in part formed by at least one flexible sealing element, which is not shown here but is shown in FIG. 5. The sealing element may be connected to the collector unit 7 by a cohesive material joint. The sealing element may be formed at least partly from a foam material.

The air ducting system 6 moreover comprises two air duct units 10 (and 26 in FIGS. 3 and 4) of different design, either of which can be connected to and non-destructively detached from the collector unit 7 and of which only a first air duct unit 10 is shown in FIG. 1. The other air duct unit 26 is shown in FIGS. 3 and 4. An air duct passage 16 running through the collector unit 7 and the air duct unit 10 is formed without any flow edges. The air duct unit 10 comprises a first coupling end portion 11 for connecting the air duct unit 10 to the collector unit 7, a second coupling end portion 12 for connecting the air duct unit 10 to the measuring device 2, and an intervening tubular middle portion 28.

The second coupling end portion 12 of the air duct unit 10 is designed for receiving the connecting flange 5 of the component portion 3 of the measuring device 2 in a positive interlock, wherein the connecting flange 5 can be inserted into a socket 13 on the second coupling end portion 12 by moving the component portion 3 in the direction of the arrow 24 shown. An elastic sealing element 14, which is in airtight contact with the connecting flange 5 when the latter has been inserted into the socket 13, is arranged in the socket 13. For this purpose, a peripheral sealing bead 15, which with the connecting flange 5 situated in the socket 13 is pressed against the sealing element 14, is formed on the connecting flange 5. The air ducting system 6 may comprise at least one mechanical fastener (not shown) for securing the connection between the air duct unit 10 and the measuring device 2. For example, screwed connections (not shown) may be arranged on the second coupling end portion 12, for which purpose holes 21 are formed on the second coupling end portion 12.

As can be seen, in particular, by looking at FIGS. 1-4 together, the first coupling portions 11 of the air duct units 10 (and 26 in FIGS. 3 and 4) are of the same design or a common design. The air duct units 10 (and 26 in FIGS. 3 and 4) on the other hand differ from one another in the design of their second coupling portions 12 (and 29 in FIGS. 3 and 4).

On its other end portion, the collector unit 7 comprises a connecting portion 17 for connecting the collector unit 7 to the air duct unit 10. The connecting portion 17 and the first coupling end portion 11 of the air duct unit 10 form a bayonet fastening. For this purpose, two projections 18, projecting radially outwards and circumferentially offset in relation to one another, are arranged on the connecting portion 17, each of which projections can be inserted into its own bayonet recess 19 on the first coupling end portion 11, in order to lock the bayonet fastening. Arranged on an outer side of the collector unit 7 is a circumferential flange 20, which forms an axial stop for the first coupling end portion 11, on which the first coupling end portion 11 bears when the collector unit 7 is connected to the air duct unit 10, as shown in FIG. 2.

The air ducting system 6 may comprise at least two collector units 7 (and 36 in FIG. 6) of different design, the connecting portions 17 of which are of the same design and which differ from one another at least in the design of their contact faces.

Figure 2:
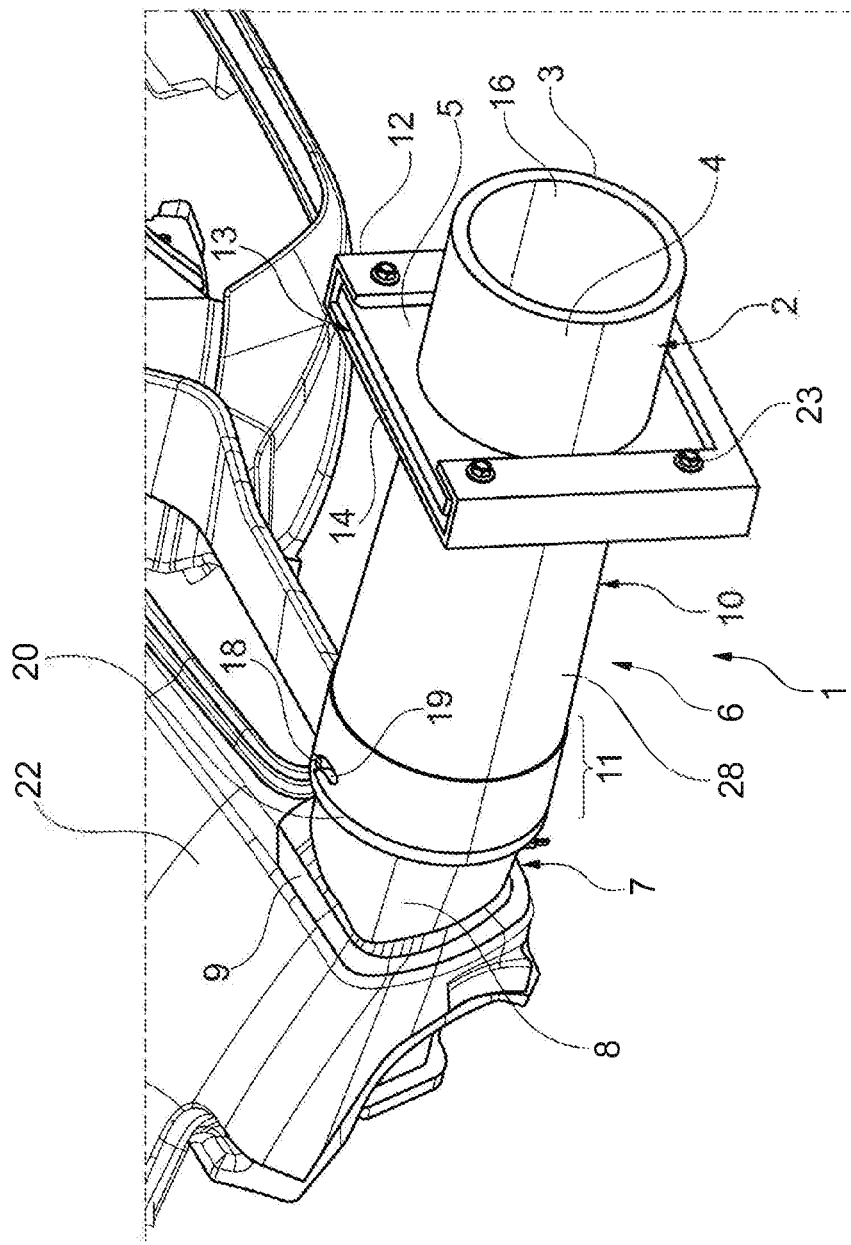
FIG. 2 shows a schematic and perspective representation of the measuring system shown in FIG. 1 in use.

FIG. 2 shows a schematic and perspective representation of the measuring system 1 shown in FIG. 1 in use. Represented here is a dashboard 22 of a motor vehicle (not shown), on which an air vent (not shown) is arranged, which is covered by the collector unit 7. The locked bayonet fastening gives the collector unit 7 an airtight connection to the air duct unit 10. The connecting flange 5 of the component portion 3 of the measuring device 2 is inserted into the socket 13 on the second coupling end portion 12 of the air duct unit 10 to form a positive interlock, so that the air duct unit 10 has an airtight connection to the component portion 3. The connection between the connecting flange 5 and the second coupling end portion 12 is moreover secured by four mechanical fasteners 23 in the form of screwed connections. The collector unit 7 has an airtight connection by way of its contact flange 9 to the air vent or a portion of the dashboard 22 enclosing this. In the state of the measuring system 1 shown a measurement of the parameter of the air flow emerging from the air vent can be performed.

FIG. 3 shows a schematic and perspective representation of the exemplary embodiment of a measuring system 1 for connection to a second measuring device 25. The collector unit 7 of the measuring system 1 is identical to the exemplary embodiment shown in FIGS. 1 and 2. To avoid repetition, reference is therefore made to the description of FIGS. 1 and 2 above for a description of the collector unit 7.

FIG. 3 shows the second air duct unit 26 of the air ducting system 6 of the measuring system 1, which can be connected to the collector unit 7 instead of the air duct unit shown in FIGS. 1 and 2. The air duct unit 26 differs from the exemplary embodiment shown in FIGS. 1 and 2 in the smaller axial length of its tubular middle portion 28 and in the design of its second coupling end portion 29. The second coupling end portion 29 comprises two retaining elements 30 arranged at an interval from one another 30, between which a socket 31 is arranged for receiving a portion of a component portion 32 of the measuring device 25 shown in a positive interlock. This portion can be inserted in the socket 31 to form a positive interlock by moving the component portion 32 in the direction of the arrow 33 shown.

FIG. 4 shows a schematic and perspective representation of the measuring system 1 shown in FIG. 3 in use. Represented here is a dashboard 22 of a motor vehicle (not shown), on which an air vent (not shown) is arranged, which is covered by the collector unit 7. The locked bayonet fastening gives the collector unit 7 an airtight connection to the air duct unit 26. The component portion 32 of the measuring device 25 is inserted into the socket 31 on the second coupling end portion 29 of the air duct unit 26 to form a positive interlock. The collector unit 7 has an airtight connection by way of its contact flange 9 to the air vent or a portion of the dashboard 22 enclosing this. In the state of the measuring system 1 shown a measurement of the parameter of the air flow emerging from the air vent can be performed.

FIG. 5 shows a schematic and perspective representation of the collector unit 7 shown in FIGS. 1 to 4 from another perspective. It shows the contact face 34, which is arranged on the contact flange 9 and which is formed partly by a flexible or elastic sealing element 35. The sealing element 35 takes the form of an adhesive strip and is connected to the collector unit 7 by a cohesive material joint. The sealing element 35 is formed partly from a foam material.

Figure 6:
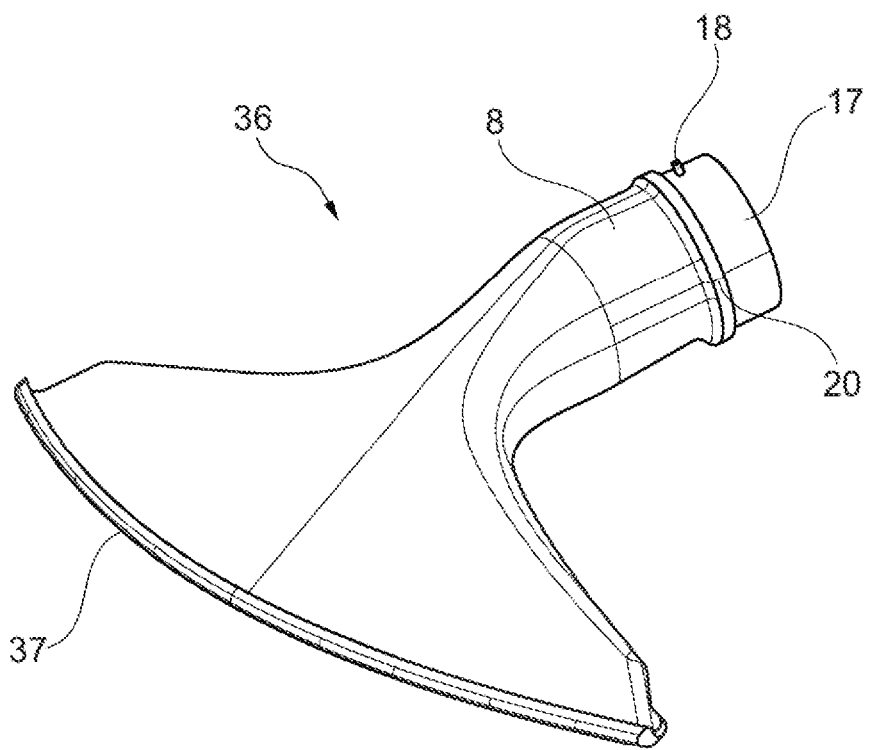
FIG. 6 shows a schematic and perspective representation of a further collector unit of the exemplary embodiment of a measuring system.

FIG. 6 shows a schematic and perspective representation of a further collector unit 36 of the exemplary embodiment of a measuring system 1 shown in FIGS. 1 to 5. This collector unit 36 differs from the exemplary embodiment shown in FIGS. 1 to 5 particularly in the shape of the contact flange 37. The contact flange 37 is designed to give the collector unit 36 an airtight connection to an air vent (not shown), which is directed onto a windshield (not shown) of a motor vehicle (not shown), or a portion of some other vehicle component (not shown) enclosing the air vent. In order to avoid repetition, reference should otherwise be made to the description above of the collector unit shown in FIGS. 1 to 5. The air duct units 26 and 10 and the elements previously described may be connected to the collector unit 36 in the way hitherto outlined. It can be seen that the respective collector unit can be adapted to different air vents through adaptations of the respective contact flange.

What is claimed:

1. An air ducting system for ducting an air flow emerging from an air vent to a measuring device, comprising:
   at least one collector unit for collecting the air flow emerging from the air vent, characterized by at least two air duct units of different design, that are connectable to and non-destructively detached from the collector unit, wherein each of said at least two air duct units include a first coupling end portion for connecting a respective air duct unit to the collector unit and a second coupling end portion for connecting the respective air duct unit to a respective measuring device, wherein the first coupling end portions are of same design and the air duct units differ from one another at least in design of their second coupling end portions.

2. The air ducting system as claimed in claim 1, characterized in that said at least one collector unit comprises a connecting portion for connecting the at least one collector unit to the respective air duct unit, wherein the connecting portion and the first coupling end portion of the respective air duct unit form a bayonet fastening.

3. The air ducting system as claimed in claim 2, characterized in that said at least one collector unit includes a contact face formed at least partly by at least one flexible sealing element, wherein the at least one flexible sealing element is preferably connected to the at least one collector unit by a cohesive material joint.

4. The air ducting system as claimed in claim 3, characterized in that the at least one flexible sealing element is formed at least partly from a foam material.

5. The air ducting system as claimed in claim 4, characterized in that the second coupling end portion of the respective air duct unit is designed to receive a component portion of a measuring device at least partly through positive interlock.

6. The air ducting system as claimed in claim 5, characterized in that an air duct passage running through the at least one collector unit and/or the respective air duct unit is formed without any flow edges.

7. The air ducting system as claimed in claim 6, characterized by at least two collector units of different design, connecting portions of which are of the same design and which differ from one another at least in their contact faces.

8. A measuring system for measuring at least one parameter of an air flow emerging from an air vent adapted to introduce said air flow directly into a passenger compartment of a vehicle, comprising at least two measuring devices of different design for alternative use in measuring the parameter, and at least one air ducting system adapted for ducting the air flow from the air vent to the respective measuring device, characterized in that the at least one air ducting system is designed according to claim 1.

9. The measuring system as claimed in claim 8, characterized in that each measuring device comprises a component portion adapted to be connected to the second coupling end portion of the respective air duct unit by a positive interlock.

10. The measuring system as claimed in claim 9, characterized by at least one mechanical fastener adapted to secure connection between the respective air duct unit and the respective measuring device.

11. An air ducting system for ducting an air flow from an air vent to a measuring device, comprising:
a collector unit adapted to collect said air flow from said air vent; and
at least two air duct units, wherein each of said at least two air duct units includes a first coupling end portion adapted to connect to said collector unit and a second coupling end portion adapted to connect to said measuring device wherein (a) first coupling end portions of said at least two air duct units are of common design and (b) second coupling end portions of said at least two air duct units are of differing design.

* * * * *